(12) United States Patent
Carney et al.

(10) Patent No.: US 9,286,027 B2
(45) Date of Patent: Mar. 15, 2016

(54) DIGITAL PICTURE FRAME HAVING COMMUNICATION CAPABILITIES

(75) Inventors: Patrick Carney, Seattle, WA (US); Sinclair Temple, Seattle, WA (US); Andrea Small, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 260 days.

(21) Appl. No.: 12/937,234

(22) PCT Filed: Apr. 11, 2008

(86) PCT No.: PCT/US2008/060123
§ 371 (c)(1),
(2), (4) Date: Jan. 13, 2011

(87) PCT Pub. No.: WO2009/126165
PCT Pub. Date: Oct. 15, 2009

(65) Prior Publication Data
US 2011/0128242 A1    Jun. 2, 2011

(51) Int. Cl.
*G06F 3/14* (2006.01)
*H04N 1/00* (2006.01)
*G06F 1/16* (2006.01)

(52) U.S. Cl.
CPC .............. *G06F 3/1446* (2013.01); *G06F 1/166* (2013.01); *G06F 1/1616* (2013.01); *G06F 1/1626* (2013.01); *G06F 1/1643* (2013.01); *G06F 1/1647* (2013.01); *G06F 1/1656* (2013.01); *G06F 1/1684* (2013.01); *G06F 1/1694* (2013.01); *G06F 1/1698* (2013.01);
(Continued)

(58) Field of Classification Search
CPC ... G06F 1/1616; G06F 1/1626; G06F 1/1643; G06F 1/1647; G06F 1/1656; G06F 1/166; G06F 1/1684; G06F 1/1694; G06F 1/1698; G06F 3/1446; G06F 3/0481; G06F 3/14; H04N 1/00127; H04N 1/00129; H04N 1/00442; H04N 1/00453
USPC .................. 345/173–184; 709/217; 707/705; 455/566
See application file for complete search history.

(56) References Cited

U.S. PATENT DOCUMENTS 6,313,853 B1 * 11/2001 Lamontagne et al. ........ 715/762
6,630,941 B1    10/2003 Addison
(Continued)

OTHER PUBLICATIONS

"Vizit User Guide." http://vizitme.com/PDFs/UserGuide.1.0.1.pdf, [Last accessed: Jun. 17, 2010], 22 pages.
(Continued)

*Primary Examiner* — Koosha Sharifi-Tafreshi
*Assistant Examiner* — Chun-Nan Lin
(74) *Attorney, Agent, or Firm* — Perkins Coie LLP

(57) ABSTRACT

A digital display device for displaying content associated with multiple sets of sources of content is described herein. The digital display device includes a display configured to provide at least a first display region and a second display region. The digital display device further includes a communication component configured to transmit and receive signals to and from a telecommunications network and a storage component configured to store a mapping of sources of content to the first and second display regions. The digital display device also includes a routing component that automatically routes content associated with the first and second sets of sources for display on at least one of the first and second display regions. The first and second display regions display the content substantially simultaneously.

25 Claims, 6 Drawing Sheets

(52) U.S. Cl.
CPC ....... *H04N1/00127* (2013.01); *H04N 1/00129* (2013.01); *H04N 1/00442* (2013.01); *H04N 1/00453* (2013.01); *H04N 1/00458* (2013.01)

(56) References Cited

U.S. PATENT DOCUMENTS

| | | | |
|---|---|---|---|
| 6,717,567 B1 | 4/2004 | Bowden, III et al. | |
| 6,961,046 B2 | 11/2005 | Bowden, III et al. | |
| 7,034,853 B2 | 4/2006 | Cho et al. | |
| 7,205,959 B2 | 4/2007 | Henriksson | |
| 7,263,382 B2 | 8/2007 | Chandhok et al. | |
| 7,404,001 B2 | 7/2008 | Campbell et al. | |
| 7,411,567 B2 | 8/2008 | Okude et al. | |
| 7,667,707 B1 | 2/2010 | Margulis | |
| 7,908,555 B2 * | 3/2011 | Zellner | 715/718 |
| 8,049,678 B2 | 11/2011 | Lee et al. | |
| 8,081,140 B2 | 12/2011 | Jung | |
| 2002/0039084 A1 * | 4/2002 | Yamaguchi | 345/1.1 |
| 2002/0071139 A1 | 6/2002 | Janik | |
| 2002/0126150 A1 | 9/2002 | Parry | |
| 2003/0020671 A1 * | 1/2003 | Santoro et al. | 345/1.3 |
| 2003/0128825 A1 | 7/2003 | Loudermilk | |
| 2004/0067768 A1 | 4/2004 | King et al. | |
| 2004/0174327 A1 | 9/2004 | Bowden et al. | |
| 2005/0012758 A1 | 1/2005 | Christou | |
| 2005/0117910 A1 * | 6/2005 | Foote et al. | 398/106 |
| 2005/0162337 A1 * | 7/2005 | Ohashi et al. | 345/1.1 |
| 2005/0204387 A1 | 9/2005 | Knudson et al. | |
| 2006/0077544 A1 | 4/2006 | Stark | |
| 2006/0164326 A1 | 7/2006 | Date | |
| 2006/0271968 A1 * | 11/2006 | Zellner | 725/81 |
| 2007/0097609 A1 | 5/2007 | Moscovitch | |
| 2007/0252822 A1 * | 11/2007 | Kim et al. | 345/173 |
| 2008/0007481 A1 | 1/2008 | Chen et al. | |
| 2008/0055263 A1 * | 3/2008 | Lemay et al. | 345/173 |
| 2008/0066360 A1 | 3/2008 | Simon | |
| 2008/0070644 A1 * | 3/2008 | Park et al. | 455/575.3 |
| 2008/0146339 A1 | 6/2008 | Olsen et al. | |
| 2008/0165082 A1 | 7/2008 | Manico et al. | |
| 2008/0168361 A1 * | 7/2008 | Forstall et al. | 715/753 |
| 2008/0231544 A1 * | 9/2008 | Cooper et al. | 345/1.1 |
| 2008/0309617 A1 * | 12/2008 | Kong et al. | 345/157 |
| 2008/0313540 A1 | 12/2008 | Dirks et al. | |
| 2009/0046033 A1 | 2/2009 | Siegel | |
| 2009/0082951 A1 * | 3/2009 | Graessley | 701/200 |
| 2009/0153436 A1 | 6/2009 | Ju et al. | |
| 2009/0256780 A1 | 10/2009 | Small et al. | |
| 2010/0177047 A1 | 7/2010 | Brenneman et al. | |

OTHER PUBLICATIONS

"Rubik's TouchCube," Copyright 2009, http://rubikstouchcube.com, 1 page.

International Search Report and Written Opinion, International Application No. PCT/2008/60123, Filed on Apr. 11, 2008, Applicant: T-Mobile USA, Inc., Date of Mailing Jun. 30, 2008, 9 pages.

Pogue, David, "Slide Show Mounted in a Frame," http://nytimes.com, Feb. 7, 2008, 4 pages.

* cited by examiner

DIGITAL PICTURE FRAME HAVING COMMUNICATION CAPABILITIES

BACKGROUND

Typically, digital photo frames display digital photos that are uploaded by a user via a memory card, Universal Serial Bus (USB) connection, or other method. However, one drawback to this approach is that it requires the user to have basic technological expertise in order to upload the digital photos to the digital photo frame. Because this approach requires a certain level of comfort with technology, some users may be dissuaded from utilizing digital photo frames. Accordingly, the need exists for digital photo frames that overcome the above limitations, in addition to providing other benefits.

DETAILED DESCRIPTION

A digital display device for displaying content associated with multiple sets of sources of content is described herein. The digital display device includes a display configured to provide at least a first display region and a second display region. The digital display device further includes a communication component configured to transmit and receive signals to and from a telecommunications network and a storage component configured to store a mapping of sources of content to the first and second display regions. The digital display device also includes a routing component that automatically routes content associated with the first and second sets of sources for display on at least one of the first and second display regions. The first and second display regions display the content substantially simultaneously.

In some embodiments, the digital display device allows a user to engage in real-time communications with a source of content. The real time communication may be created with the source of content by selecting the display region that is displaying content that corresponds to the source of content. The digital display device establishes a real-time communication session with the corresponding source of content over the telecommunications network.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
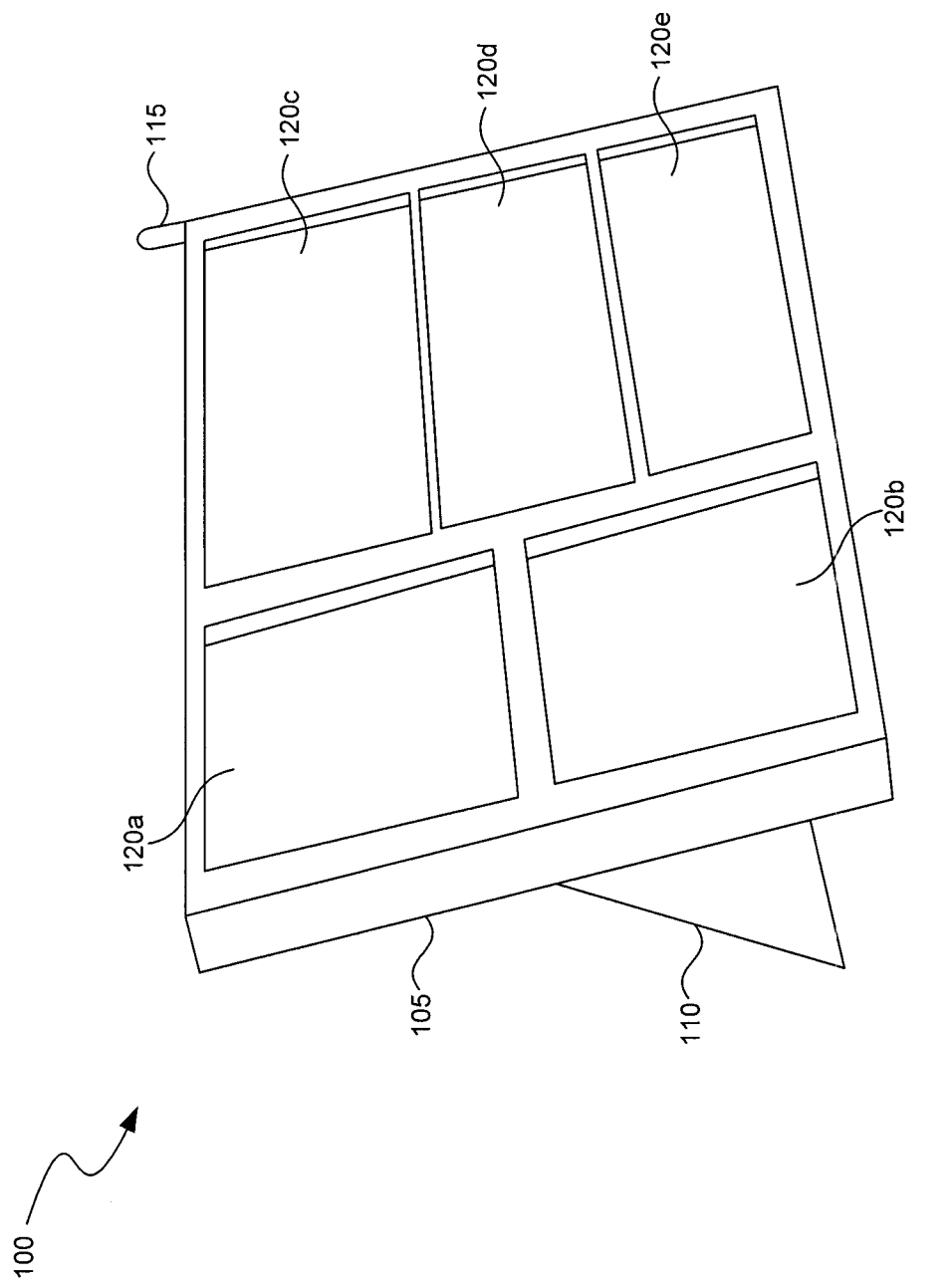
FIG. 1 is an isometric view of a digital display device having multiple display regions.

FIG. 1 is an isometric view of a digital display device 100 having multiple display regions that may be associated with sources of content. The digital display device 100 is supported by a stand 110 and includes a frame 105 and an antenna 115 attached to the frame 105. In some embodiments, the antenna 115 is embodied within the frame 105 such that it is not apparent to an observer, or the frame 105 is configured to act as an antenna. In some embodiments, in addition to or instead of the stand 110, the digital display device 100 includes a hanger configured to enable the digital display device 100 to be attached to a surface (e.g., a wall). The antenna 115 enables a wireless connection to a telecommunications network. In some embodiments, in addition to or in place of the antenna 115, the digital display device 100 includes components (not shown in FIG. 1) that enable a wired connection to a telecommunications network (e.g., an RJ-11 port, an Ethernet port, a cable modem port, or other wired port). The digital display device 100 also includes five display regions 120 (shown individually as display regions 120a-e). The digital display device 100 can include fewer than (e.g., one display region) or more than (e.g., six display regions) the depicted five display regions 120. The digital display device 100 can also have the display regions 120 arranged in configurations other than the configuration illustrated in FIG. 1. For example, the display regions can all have portrait orientations or can all have landscape orientations, or some combination of portrait and landscape orientations. As another example, the display regions may be positioned adjacent to one another in a linear fashion. The display regions 120 can also have varying sizes and shapes (e.g., circular, elliptical, square, rectangular, polygonal, etc.). Each display region may be constructed using an individual display panel, such as a liquid crystal display (LCD), an Organic Light-Emitting Diode (OLED) display, a Liquid Crystal On Silicon (LCOS) display, etc. Alternatively, each display region may be a mapped region of a single, larger display panel.

The digital display device 100 also includes communication components and/or circuits (not shown in FIG. 1) that enable the digital display device 100 to communicate by transmitting and receiving wireless signals using licensed, semi-licensed or unlicensed spectrum over a telecommunications network. Telecommunications networks include third-party telecommunications networks such as a Global System for Mobile (GSM) mobile telecommunications network, a code/time division multiple access (CDMA/TDMA) mobile telecommunications network, a 3rd Generation (3G) mobile telecommunications network (e.g. General Packet Radio Service (GPRS/EGPRS), Enhanced Data rates for GSM Evolution (EDGE), or Universal Mobile Telecommunications System (UMTS)), or other telecommunications network. For example, if the digital display device 100 is configured to communicate over a GSM mobile telecommunications network, the digital display device 100 may include a Subscriber Identity Module (SIM) card that stores an International Mobile Subscriber Identity (IMSI) number that can be used to identify the digital display device 100 on the GSM mobile telecommunications network. If the digital display device 100 is configured to communicate over another telecommunications network, the digital display device 100 may include other components that enable it to be identified on the other telecommunications network. Telecommunications networks also include local or home-based telecommunications networks, such as telecommunications networks using Generic Access Network (GAN) or Unlicensed/Universal Mobile Access (UMA) standards and protocols. In some embodiments, the digital display device 100 includes components that enable it to connect to a telecommunications network using the aforementioned GAN or UMA standards and protocols. For example, the digital display device 100 may include components that support Internet Protocol (IP)-based communication over a Wireless Local Area Network (WLAN) and components that enable communication with the telecommunications network over the IP-based WLAN.

Because the digital display device 100 is configured to communicate with a telecommunications network, the digital display device 100 incorporates an identifier that identifies it to the telecommunications network. Example identifiers include a telephone number, an IMSI, an e-mail address, an IP address, a Media Access Control (MAC) address, or other identifier. Because the digital display device 100 has an identifier assigned to it, the digital display device 100 can receive content that is sent to the identifier. As will be described in further detail with reference to e.g., FIGS. 5-6B, associations are created between each of the display regions 120 of the digital display device 100 and sources of content, either on a permanent basis or on a temporary basis. For example, display regions may be associated with sources used or operated by family members (e.g., children, grandchildren, etc.), friends, or colleagues. As another example, a display region may be associated with sources used or operated by a family or other group (e.g., a soccer team, a book club, etc.). As another example, the display regions may be temporarily mapped to respective sources, thereby enabling content from the sources to be displayed in alternating display regions. In some embodiments, the sources are used or operated by subscribers of the same telecommunications network to which the digital display device 100 is connected (e.g., the subscriber owns or utilizes a source device that connects to the same telecommunications network). The sources can send content (e.g., still photos or images, video clips, text messages, interactive video games, metadata associated with any of the foregoing or other types of content) to the identifier assigned to the digital display device 100. The content is transmitted over the telecommunications network to a transceiving site (such as a base station or wireless router) serving the digital display device 100. The digital display device 100 may store the content in a storage medium (not shown in FIG. 1) such as a hard disk, flash memory, memory card, etc., located in the digital display device, in an external device accessible via a WLAN, a network location or at a server location accessible via the Internet. Upon receiving the indicated content, the digital display device 100 automatically displays the content in the display region 120 that is permanently or temporarily associated with the source that sent it. The digital display device 100 displays the content in the different display regions 120 substantially simultaneously. In some embodiments, each time that content is received by the digital display device 100, the digital display device automatically displays the new content. In this way, the content displayed in the display regions 120 may be constantly refreshed. In some embodiments, the digital display device stores received content and successively displays the content on the display regions 120 (e.g., displays the stored content in slideshow fashion).

It will be appreciated that one advantage of the digital display device 100 is that it enables a user to enjoy new content associated with one or more sources without having to initiate the uploading of the new content. The digital display device 100 can therefore be successfully utilized by users with little or no technical expertise. Another advantage is that the user may enjoy content from a large number of sources at one time with a glance, in contrast to prior displays that require a user to wait while images are sequentially presented to the user.

Figure 2:
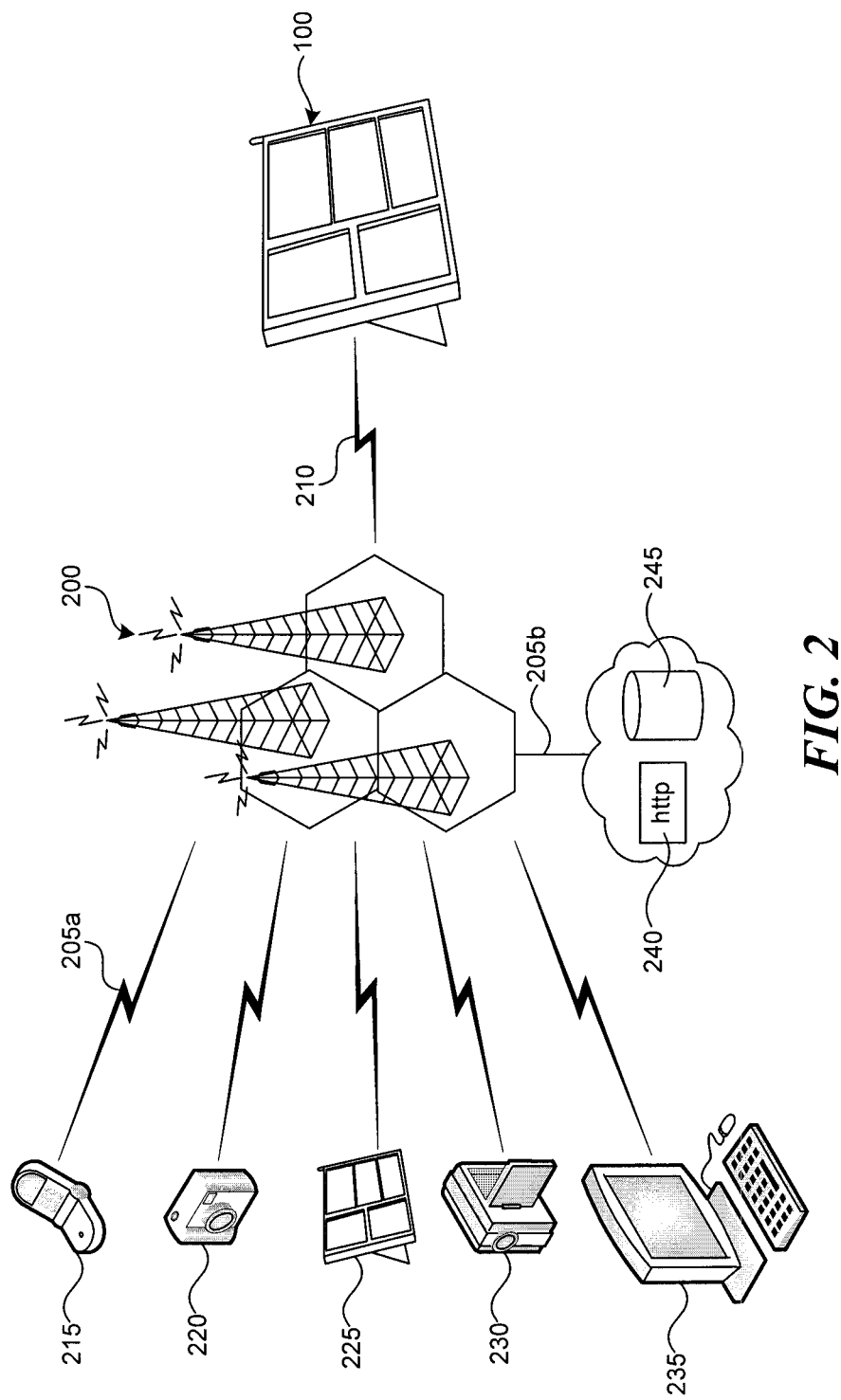
FIG. 2 illustrates a flow of content from various sources of content to the digital display device.

FIG. 2 illustrates a flow of content from various sources to the digital display device 100. Illustrated sources of content (i.e., content providers) include a mobile phone 215, a digital camera 220, another digital display device 225, a digital video camera 230, and a personal computer 235. Other types of sources may include websites 240 and online content repositories 245. The illustrated sources transmit content over a telecommunications network 200, which transmits the content via a wireless signal 210 to the digital display device 100. If a source is capable of sending content directly to the telecommunications network 200 (e.g., in the case of the source mobile phone 215), the content can be sent via a wireless connection 205a or wired connection 205b. Alternatively, if the source is utilizing a device that is capable of sending content indirectly to the telecommunications network 200 (e.g., a device that connects indirectly to the telecommunications network via a network such as the Internet), the content may be sent over a wired (or wireless, or partially wired, partially wireless) connection to the telecommunications network 200. For example, source personal computer 235 may connect to a website hosted by a computer that is part of the telecommunications network 200 and upload content to the website. The hosting computer can then provide the content or arrange to provide the content to the digital display device 100. As another example, source digital camera 220 may wirelessly connect to a wireless network, via which content can be transmitted to the telecommunications network 200. In some embodiments, the digital display device 100 can transmit and/or receive content using methods described in PCT/US08/54793 (entitled DATA EXCHANGE INITIATED BY TAPPING DEVICES), the entirety of which is hereby incorporated by reference. Those of skill in the art will understand that a source may be any of a variety of devices or applications that connect in a variety of ways to the telecommunications network 200, and that content from those sources can be ultimately conveyed to the digital display device 100.

Figure 3:
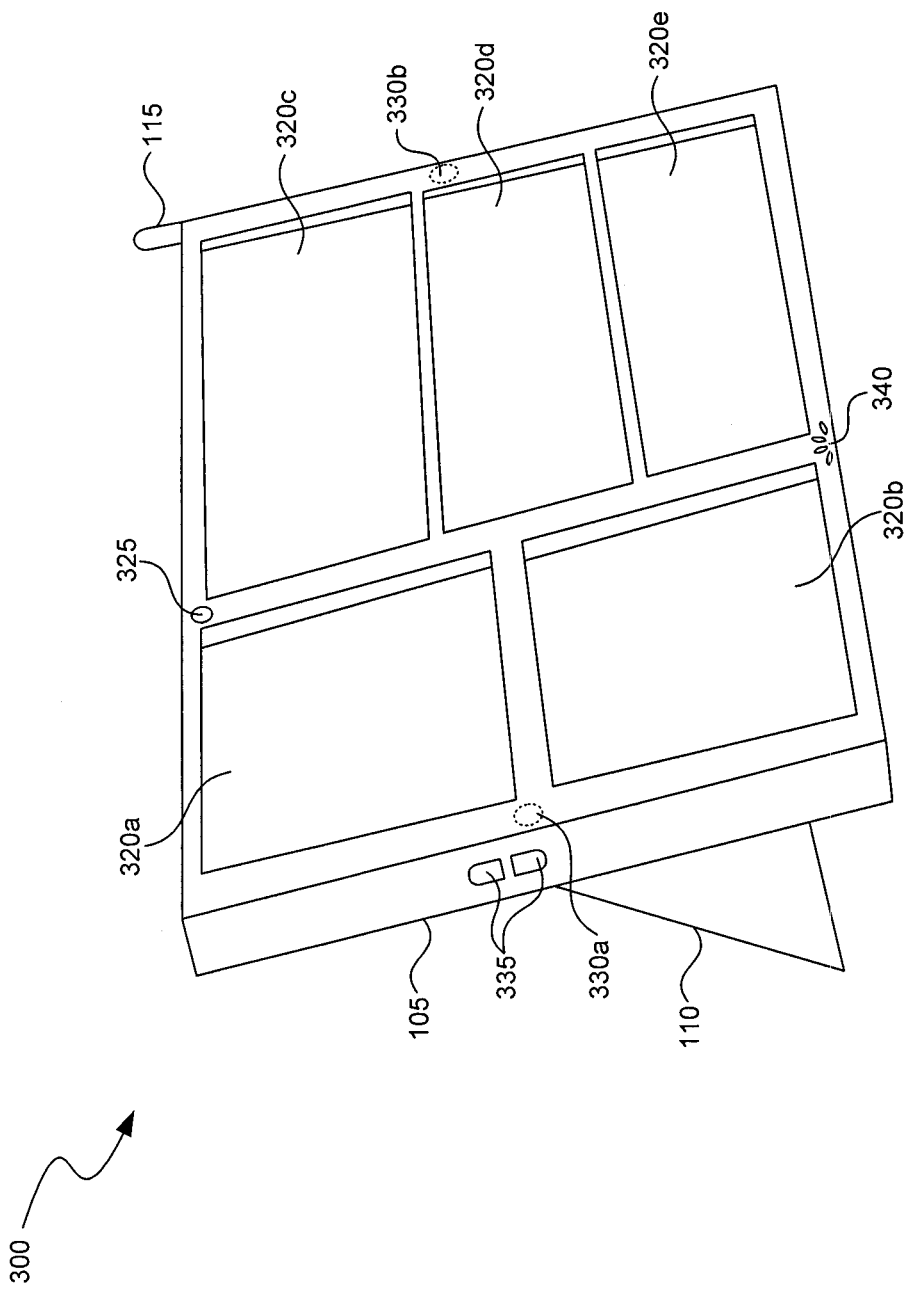
FIG. 3 is an isometric view of a digital display device having inbound and outbound communication channels.

FIG. 3 is an isometric view of a digital display device 300 configured in accordance with another embodiment of the invention. In addition to the illustrated components already discussed with reference to FIG. 1, the digital display device 300 includes audio output components 330 (shown individually as audio output components 330a and 330b). The audio output components are left and right stereo speakers that are configured to produce sound. The digital display device 300 also includes an audio input component 340 (e.g., a microphone) that is configured to receive sound. The digital display device 300 also includes touchscreen or touch-sensitive display regions 320 (shown individually as display regions 320a-e). The touch-sensitive display regions 320, when activated or actuated by a user (e.g., by touch), are configured to cause the digital display device 300 to initiate a real-time communication session with the source associated with the content that is displayed on the touch-sensitive display region 320 at the time the touch-sensitive display region 320 is touched. For example, if an image of an individual who uses or operates a source (e.g., a digital photograph of the individual) is displayed in a particular display region 320, the user can touch the particular display region 320 to cause the digital display device 300 to initiate a real-time communication session (such as a voice call, a video call, an e-mail, a text message, an instant messaging session or other communication) with that individual. For example, upon successfully reaching the individual after initiating a voice call, the user can speak into the audio input component 340 and hear the individual via sound generated by the audio output components 330. The user can adjust the volume of the sound generated by the audio output components 330 by utilizing up and down buttons 335 or via the touchscreen. When the user desires to end the call, the user can again activate or actuate the touch-sensitive display region to cause the digital display device 300 to end the initiated voice communication. In some embodiments, a display region is associated with a source or sources used or operated by multiple individuals. For example, a display region may be associated with a source used or operated by two individuals. The user can touch the display region associated with the source to initiate real-time communications with the individuals (e.g., three-way calling; a chat room session, an instant messaging session).

In some embodiments, while a user is engaged in a real-time communication with a first individual, the user can initiate a second real-time communication session with a second individual who uses or operates a second source, and conference the two individuals together into a group real-time communication session. For example, a user already engaged in a voice communication with a first individual can initiate a second voice communication by activating or actuating a second touch-sensitive display region at the time the second touch-sensitive display region is displaying content associated with the second source. When the second voice communication with the second individual is successfully initiated, the user can conference in the two individuals by again activating or actuating the first touch-sensitive display region associated with the first source. Alternatively, if the second voice communication is not successfully initiated, the user can return to the first voice communication by activating or actuating the second touch-sensitive display region, thus causing it to end and returning the user to the first voice communication. Additional participants to the conference call can be similarly added. Other types of group real time communications can similarly be initiated in this fashion (e.g., a video conferencing session, an instant messaging session, a text messaging session, a chat room session, etc.).

The digital display device 300 also includes a camera 325 that is configured to capture still or moving images for transmittal to the telecommunications network and ultimately to a remote recipient, and a button (not shown in FIG. 3) configured to activate the camera 325. For example, a user can position himself or herself in front of the camera 325 and activate the camera 325 (e.g., by pressing the button, utilizing a remote or otherwise successfully triggering the digital display device's functionality) to capture a still or moving image of himself or herself. The user can then touch a touch-screen display region 320 to send the captured image to the individual using or operating the source associated with the touch-screen display region 320. In some embodiments, the user can activate the camera 325 before or during an initiated real-time communication session and cause the digital display device 300 to transmit one or more still or moving images over the telecommunications network to a remote recipient. A user of the digital display device 300 can thus provide content to another user, such as another user of another digital display device.

Figure 4:
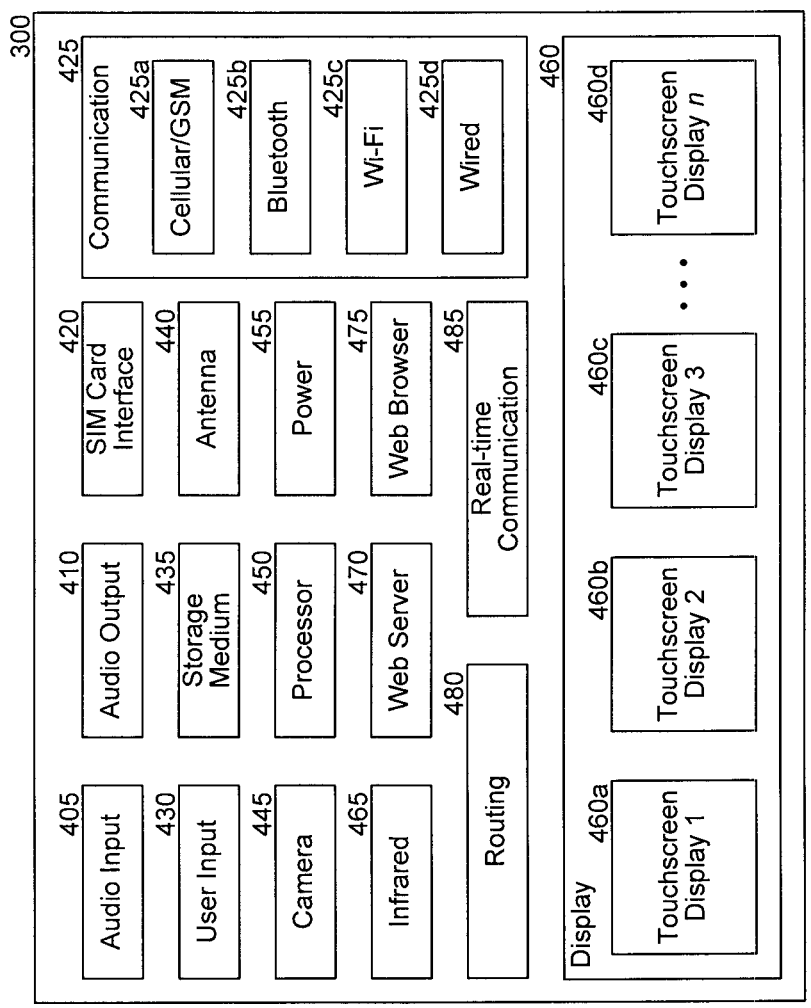
FIG. 4 is a schematic view of components of a digital display device having multiple display regions.

FIG. 4 is a schematic view of components of the digital display device 300 having multiple display regions. The digital display device 300 includes various components that enable it to provide the functionality described herein as well as additional functionality. These components include an audio input component 405 (e.g., microphone) and an audio output component 410 (e.g., speakers). A user input component 430 (e.g., buttons, alpha-numerical keyboard, etc.) enables the user to interact with the digital display device (e.g., adjust speaker volume, access stored content, adjust configuration settings, etc.). A camera component 445 (e.g., digital camera) captures images (e.g., still or moving images). A storage medium component 435 (e.g., hard drive, flash memory, memory card, etc.) stores content and other data (e.g., processing instructions, configuration settings, etc.). A processor 450 executes processing instructions. The digital display device 300 also may include a SIM card interface 420, which enables the digital display device 300 to receive a SIM card for purposes of accessing a GSM/GPRS/EDGE/UMTS telecommunications network, and an antenna 440 for transmitting and receiving wireless signals. The digital display device 300 also includes a power source 455 (e.g., batteries, AC/DC converter, etc.), a communication component 425, which may include a GSM/GPRS/EDGE/UMTS component 425a, a Bluetooth component 425b, a Wi-Fi component 425c and/or a wired component 425d (e.g., RJ-11 port, Ethernet port, etc.). The Bluetooth component 425b and/or the Wi-Fi component 425c enable the digital display device 300 to transmit and receive wireless signals in the 2.4 GHz Industrial Scientific Medical (ISM) band. Other wireless protocols (e.g., Mobile Broadband Wireless Access (MBWA), Ultra Wideband (UWB), ZigBee and other protocols) may also be supported. The digital display device 300 also includes an infrared component 465 that enables communication over an infrared spectrum (e.g., for communicating with a remote control that operates the digital display device 300). The digital display device 300 also includes a display component 460. The display component 460 may comprise one or several touchscreen liquid crystal displays 460 (shown individually as touchscreen displays 460a-n), each of which is associated with a display region. Alternatively, the digital display device may include a single touchscreen liquid crystal display that is mapped via software to provide the various display regions. The displays 460 display content associated with the display regions and are touch-activated to provide varied functionality. In addition to displaying content, the touchscreen displays 460 can display user interfaces (e.g. alphanumerical keyboard, buttons for selecting options, menus, etc.) that enable users to interact with the digital display device 300, either by using the touchscreen displays or by a remote. The digital display device also includes a routing component 480 that automatically routes received content to the appropriate display 460. The digital display device 300 also includes a real-time communication component 485 (e.g., hardware and/or software for audio and/or video communication, hardware and/or software for text messaging, instant messaging, or chat room messaging). In some embodiments, the digital display device 300 includes a web server component 470 that provides interfaces (such as those described with reference to FIGS. 6A and 6B) for interacting with the digital display device 300. The digital display device 300 may also include a browser component 475 that fetches or retrieves content over an HTTP connection or other supported protocol (e.g., File Transfer Protocol (FTP), Secure Shell (SSH), RSS feeds, etc.). The digital display device 300 can also include other components, circuits, chips, etc. that enable the digital display device 300 to provide the functionality described herein as well as additional functionality.

Figure 5:
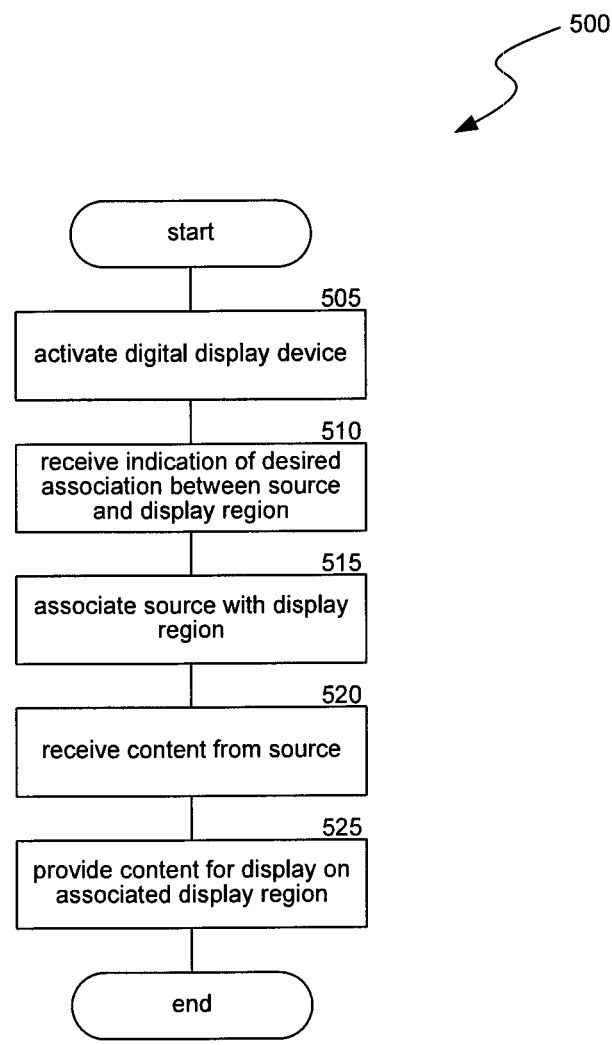
FIG. 5 is a flow diagram of a process for associating sources of content with display regions of a digital display device and providing content for display on associated display regions.

FIG. 5 is a flow diagram of a process 500 for associating sources with display regions of a digital display device and providing content from sources on associated display regions. At block 505, the digital display device is activated on a telecommunications network. The digital display device may be activated on a telecommunications network in any number of ways. For example, the digital display device may be activated by assigning it an additional identifier (e.g., a telephone number), or by marking as active a record in a database that is associated with the digital display device. In some embodiments, activation of the digital display device may be done at point-of-sale or prior to first use of the digital display device (e.g., the digital display device may have an identifier already assigned to it). In some embodiments, a user may activate the digital display device by accessing a website and providing an identifier to the website, which then activates the digital display device or causes it to be activated. At block 510 an indication of a desired association between a source of content and a display region of the digital display device is received from the user. For example, the user may indicate a desired association by accessing a website, identifying the user's digital display device, and assigning each of the display regions to a different source or group of sources used by an individual or group of individuals, by identifying the source(s) by their identifier(s). As another example, the user may indicate a desired association by using interfaces provided by the digital display device. At block 515 sources of content are associated with display regions of the digital display device.

Figure 6A:
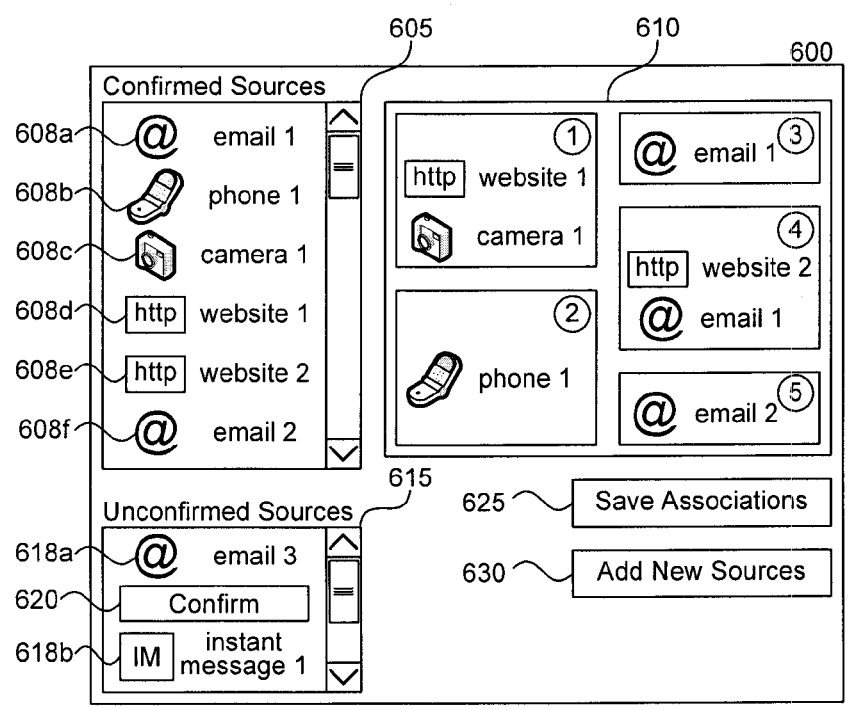
FIGS. 6A and 6B illustrate representative interfaces for creating associations between sources of content and display regions of a digital display device.
Figure 6B:
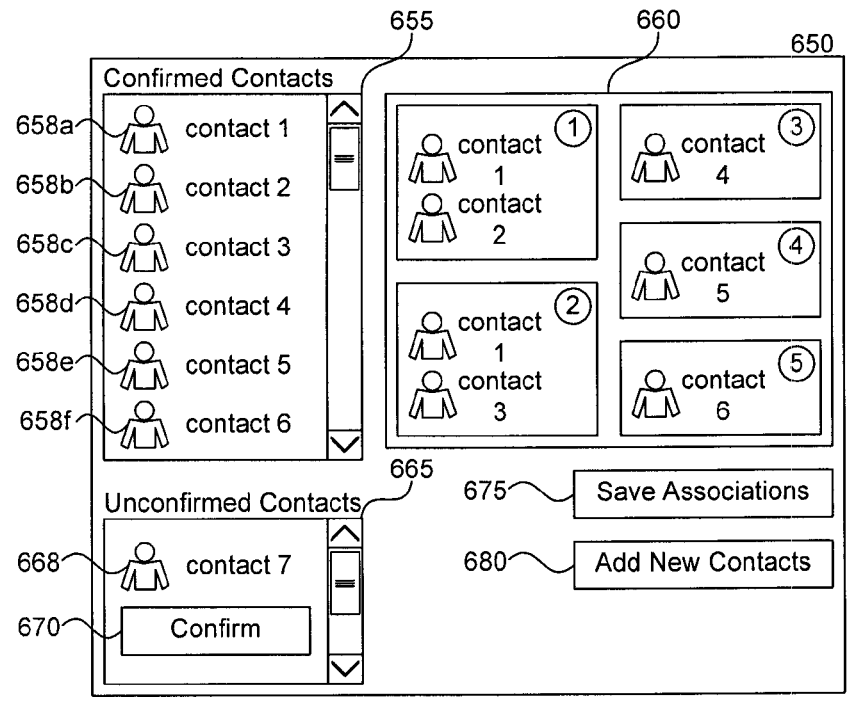

FIGS. 6A and 6B illustrate representative interfaces that enable a user to create associations between sources of content and display regions of a digital display device. FIG. 6A depicts an interface 600 that includes a confirmed sources region 605 displaying a number of sources 608 (shown individually as sources 608a-f). Each source 608 corresponds to a different actual source of content (e.g., a mobile phone, a digital camera, another digital display device, a digital video camera, a personal computer, a website, etc.). Each source 608 has an identifier (e.g., a telephone number, an IMSI, an e-mail address, an IP address, a MAC address, or other identifier) associated with it. For example, each of sources 608a and 608f can have an email address associated with it; source 608b can have a telephone number associated with it; and each of sources 608d and 608e can have a website address associated with it. The interface 600 also includes a digital display device region 610 which depicts the layout of the user's actual digital display device. The digital display device region 610 includes a number of display regions that are numbered 1-5. The numbered display regions correspond to the actual display regions of the user's digital display device. The user can create associations between a source 608 and a numbered display region by moving (e.g., dragging and dropping) the source 608 to the desired numbered display region. Alternatively, the user can move a numbered display region to the desired source or use some other method to create associations. As depicted, sources 608d and 608c are associated with numbered display region 1; source 608b is associated with numbered display region 2; source 608a is associated with numbered display region 3; sources 608e and 608a are associated with numbered display region 4; and source 608f is associated with numbered display region 5. More than one source 608 can be associated with a single numbered display region (as in the case of numbered display region 1) so as to enable the corresponding actual display region to display content from more than one source. Furthermore, a source 608 can be associated with more than one numbered display region (as in the case of source 608a, which is associated with numbered display regions 3 and 4) so as to enable the content from the source 608 to be displayed on more than one corresponding actual display region (e.g., the content from the source 608 can be rotated or moved amongst the corresponding actual display regions). Creating associations in this way allows the user to specify the display region to which content from an individual source should be sent. Therefore, the interface 600 enables the user to have granular control over associations between sources of content and actual display regions.

The interface 600 also includes an unconfirmed sources region 615 displaying a number of unconfirmed sources 618 (shown individually as unconfirmed sources 618a and 618b). The user may be required to confirm unconfirmed sources 618 before the content from these unconfirmed sources 618 can be associated with the numbered display regions. Requiring the user to confirm unconfirmed sources thus prevents unconfirmed sources from having their associated content automatically displayed on the user's actual digital display device. The user can add new sources of content by selecting the "Add New Sources" button 630, which can display a new interface (not shown) for adding new sources of content.

FIG. 6B depicts another interface 650 that enables the user to create associations between contacts and display regions of the digital display device. The interface 650 includes a confirmed contacts region 655 displaying a number of contacts 658 (shown individually as contacts 658a-f). Each of the contacts 658 corresponds to an actual individual person. Each individual person may have one or more sources of content (e.g., a mobile phone, an email address, a digital camera, a website, a personal computer, etc., none of which are shown in FIG. 6B) associated with him or her. The interface 650 allows the user to associate all of (or some subset of) the sources of content associated with an individual with one or more display regions of the digital display device. Similar to the interface depicted in FIG. 6A, the interface 650 includes a digital display device region 660 which depicts the layout of the user's actual digital display device. The digital display device region 660 includes a number of display regions that are numbered 1-5. The numbered display regions correspond to the actual display regions of the user's digital display device. The user can create associations between a contact 658 and a numbered display region by moving (e.g., dragging and dropping) the contact 658 to the desired numbered display region. Alternatively, the user can move a numbered display region to the desired contact or use some other method to create associations. As depicted, contacts 658a and 658b are associated with numbered display region 1; contacts 658a and 658c are associated with numbered display region 2; contact 658d is associated with numbered display region 3; contact 658e is associated with numbered display region 4; and contact 658f is associated with numbered display region 5. More than one contact 658 can be associated with a single numbered display region (as in the case of numbered display regions 1 and 2) so as to enable the corresponding actual display region to display content from the sources of more than one contact. Furthermore, a contact 658 can be associated with more than one numbered display region (as in the case of contact 658a, which is associated with numbered display regions 1 and 2) so as to enable the content from the sources of the contact 658 to be displayed on more than one corresponding actual display region (e.g., the content from the sources of the contact 658 can be rotated or moved amongst the corresponding actual display regions). Creating associations in this way associates all of the sources of content associated with the individual (or just some subset of all of the sources of content can be associated with the individual) with one or more digital display regions. For example, contact 658e corresponds to an actual individual who may own, operate or use the following sources of content: a mobile phone, an email address, and a website. Each of the mobile phone, the email address, and the website, by virtue of contact

658e's association with numbered display region 3, is now a source of content for the corresponding actual display region on the user's digital display device. Therefore, the interface 650 enables the user to associate all of the sources of content associated with an individual with an actual display region, which can be desirable if the user wishes to segregate the display regions on the digital display device on an individual basis.

The interface 650 also includes an unconfirmed contacts region 665 displaying one or more unconfirmed contacts 668. The user may be required to confirm unconfirmed contacts 668 before the content from the sources of these unconfirmed contacts 668 may be associated with the numbered display regions. The user can add new contacts by selecting the "Add New Contacts" button 680, which can display a new interface (not shown) for adding new contacts and their sources of content.

The interfaces 600 and 650 are not mutually exclusive and could be combined to allow the user to create associations between individuals and actual display regions while still allowing granular control on a source basis. For example, the user could create associations on an individual basis using the interface 650. The user could then expand the contacts 658 to show the sources associated with each contact 658, and then delete sources or move sources amongst the different numbered display regions. Those of skill in the art will understand that other methods of creating associations between sources of content and actual display regions are possible.

Returning to FIG. 5, at block 520 content is received from one or more of the sources associated with the different display regions. Some sources of content can be considered to be "pull" sources of content and others to be "push" sources of content. For example, referring back to FIGS. 6A and 6B, website sources 608d and 608e can be considered to be "pull" sources in that website content (e.g., photos, videos, etc.) is usually (although not necessarily) "pulled" or downloaded from websites. As another example, email sources 608a and 608f can be considered to be "push" sources in that email content (e.g., text, photos, etc.) is usually (although not necessarily) "pushed" or sent from senders of emails to recipients of emails. After the user has saved the associations between the sources 608 and the numbered display regions (which can be done by selecting "Save Associations" button 625 or button 675), a notification that includes an identifier of the digital display device can be sent to "push" sources of content so as to enable the push sources of content to send content to the digital display device. For example, an email can be sent to email sources 608a and 608f to notify the email sources of the identifier (e.g., an email address) of the digital display device to which content can be sent. As another example, a text message can be sent to phone source 608b to notify the phone source 608b of an identifier (e.g., a telephone number) of the digital display device to which content can be sent. In some embodiments, each source is provided with the same identifier for the digital display device. In this case, the source of the content is determined by the source's identifier, and the content can thus be appropriately routed. In some embodiments, each source is provided with a different identifier for the digital display device. In this case, content that the source sends to the identifier can be recognized as coming from the source, and the content can thus be appropriately routed. Content can also be "pulled" from "pull" sources of content such as website sources 608d and 608e, on a periodic, ad-hoc or other basis. Content can then be appropriately routed to the proper actual display region based upon the associations created using the interfaces 600 and/or 650. It is of course possible for sources of content to be both "pull" and "push" sources. For these sources, either or both of the above methods can be used to obtain content. Those of skill in the art will understand that other methods of determining sources of content and routing the content to the actual display regions are possible.

Returning to FIG. 5, at block 525 the content is provided for display on the appropriate display regions. The digital display device can automatically display the content upon receipt substantially simultaneously in the appropriate different display regions. In some embodiments, the digital display device buffers received content by storing it in a storage medium before displaying the content. In some embodiments, the digital display device displays content in a slideshow fashion.

One skilled in the art will appreciate that the steps described above in the process 500 may be performed in an order other than the order described, and that additional or fewer steps may be performed. For example, an association between a source and a display region may be created when content is first received by the digital display device. One skilled in the art will also appreciate that the process 500 may be implemented by a server associated with the telecommunications network (e.g., an activation server) or by the digital display device itself, and/or that the interfaces 600 and 650 may be provided by a server associated with the telecommunications network (e.g., a web server) or by the digital display device itself. In some embodiments, one or more servers associated with the telecommunications network may implement the process 500, provide the interfaces 600 and 650, and store the data received via these interfaces. In these embodiments, the one or more servers associated with the telecommunications network act as intermediaries between the sources of content and the digital display device. In some embodiments, the digital display device implements the process 500, provide the interfaces 600 and/or 650 (e.g., by its embedded web server), and stores the data received via these interfaces (e.g., in its storage medium). For example, the digital display device can display in each of the display regions an alphanumerical keyboard that the user can use to input identifiers identifying sources and/or to create associations.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A digital display device for the display of content associated with a plurality of content sources, the digital display device comprising:
   a display configured to provide a plurality of display regions for displaying content from a plurality of content sources,
      wherein each content source is an electronic device,
      wherein the content includes digital images, audio or video, and
      wherein at least two of the plurality of content sources have an individual associated with each content source;
   a communication component configured to receive signals from a telecommunication network,
      wherein the signals contain content associated with the plurality of content sources;
   a storage component configured to store associations as a mapping between the content sources and the display regions, wherein each of the content sources is associated with at least one display region, and
wherein display of content from the at least one content source can be rotated or moved among display regions associated with the at least one content source; and
a routing component coupled to the communication component, the storage component, and the display, wherein the routing component is configured for:
analyzing received content to identify a source of the received content;
accessing the storage component to determine a display region associated with the identified source of the received content; and
routing the received content to the determined display region for display,
wherein the content of each of the determined display regions is displayed, and
wherein the received content is displayed automatically in the determined display region that is mapped to the identified content source,
the communication component further being configured so that, in response to a user selection of a first display region, the communication component:
initiates a real-time communication session with a first individual who is associated with the content source of the selected first display region, and
while the real-time communication session is active with the first individual, and in response to a subsequent user selection of a second display region apart from the first display region, the communication component adds a second individual who is associated with the content source of the selected second display region to the active real-time communication session,
such that the first individual and the second individual share the same real-time communication session with the user.

2. The digital display device of claim 1, wherein the storage component is further configured to store the received content.

3. The digital display device of claim 1, wherein the received content includes at least one of a still image, a moving image, and text.

4. The digital display device of claim 1, wherein the communication component is further configured to receive wireless signals from a telecommunication network.

5. The digital display device of claim 1, wherein the digital display device is associated with an identifier, and wherein the received content is sent by the sources of content to the identifier.

6. The digital display device of claim 1, wherein at least one source of content is associated with a subscriber of the telecommunication network.

7. The digital display device of claim 1, further comprising a user interface component configured to allow a user to specify at least one content source of the plurality of content sources.

8. The digital display device of claim 1, wherein the display comprises a first display panel corresponding to the first display region and a second display panel corresponding to the second display region.

9. A digital display device for displaying content associated with a plurality of content sources, the digital display device comprising:
a touchscreen display configured to provide a plurality of display regions,
wherein each of the display regions is configured to display content from an associated content source,
wherein each content source is an electronic device, and
wherein the content includes digital images, audio or video;
a communication component configured to transmit and receive signals to and from a telecommunication network from the plurality of content sources;
a storage medium configured to store a mapping of content sources to associated display regions,
wherein each of the content sources is associated with at least one of the display regions;
a router coupled to the communication component, the storage medium, and the touchscreen display, the router configured to:
analyze received content to identify a content source;
access the storage medium to determine a display region that is mapped to the identified content source; and
automatically route the received content to the determined display region, wherein the received content is displayed automatically in the determined display region that is mapped to the identified content source; and
a real-time communication component coupled to the communication component and configured to establish a multi-way real-time communication session with the multiple individuals in response to a selection of the display region associated with the at least one content source associated with multiple individuals.

10. The digital display device of claim 9, wherein the content associated with the plurality of content sources includes at least one of an image, a moving image, and text.

11. The digital display device of claim 9, further comprising a camera configured to capture at least one of an image and moving images and provide at least one of the image and the moving images to the communication component for transmittal by signals to the telecommunication network.

12. The digital display device of claim 9, wherein the communication component is further configured to transmit and receive wireless signals over the telecommunication network.

13. The digital display device of claim 9, further comprising a user interface component that is configured to allow a user to specify at least one of the plurality of content sources.

14. The digital display device of claim 9, wherein the touchscreen display comprises a touchscreen display panel corresponding to one of the display regions.

15. The digital display device of claim 9, further comprising:
an audio input component coupled to the communication component and configured to capture sound for transmittal by signals to the telecommunication network; and
an audio output component coupled to the communication component and configured to generate sound corresponding to signals received from the telecommunication network,
wherein the real-time communication session includes a voice communication session that includes the captured and generated sound.

16. The digital display device of claim 9, further comprising:
an audio input component coupled to the communication component and configured to capture sound for transmittal by signals to the telecommunication network;
an audio output component coupled to the communication component and configured to generate sound corresponding to signals received from the telecommunication network, and
a camera coupled to the communication component and configured to capture at least one of an image and moving images and provide at least one of the image and the moving images to the communication component for transmittal by signals to the telecommunication network, wherein the real-time communication session includes a video communication session that includes at least one of the image and the moving images.

17. The digital display device of claim 9, wherein the real-time communication session includes a text communication session.

18. An electronic display device for displaying content associated with a plurality of sources, the electronic display device comprising:

means for receiving signals from a telecommunication network, the signals containing content associated with a plurality of sources, wherein each source is an electronic device, and wherein the content includes digital images, audio or video;

means for transmitting signals via the telecommunication network;

means for identifying the electronic display device to the telecommunication network;

a display segmented into a plurality of regions for automatically displaying received content associated with the plurality of sources, wherein:

each of the plurality of regions is associated with at least one of the plurality of sources, display of content from the at least one source can be rotated or moved among display regions associated with the at least one source, each of the plurality of regions displays source-associated content, and the content in each of the plurality of display regions is associated with an entity; and means for initiating a real-time communication session over the telecommunication network with a first entity that is associated with the content in a first region selected by a user, and while the real-time communication session with the first entity is still active, adding a second entity to the active real-time communication session when a second region apart from the first user-selected region is subsequently selected by the user, wherein the added second entity is associated with the content in the selected second region, and wherein the first and second entities are thereby being joined in the same real-time communication session.

19. The electronic display device of claim 18, wherein the content associated with the plurality of sources includes at least one of an image, a moving image, and text.

20. The electronic display device of claim 18, further comprising:

means for capturing sound for transmittal by signals to the telecommunication network; and means for generating sound corresponding to signals received from the telecommunication network, wherein the real-time communication session includes a voice communication session including the captured and generated sound.

21. The electronic display device of claim 18, further comprising:

means for capturing sound for transmittal by signals to the telecommunication network;

means for generating sound corresponding to signals received from the telecommunication network, and means for capturing at least one of an image and moving images;

wherein the real-time communication session includes a video communication session including at least one of the image and the moving images.

22. The electronic display device of claim 18, wherein the real-time communication session includes a text communication session.

23. The electronic display device of claim 18, further comprising means for capturing at least one of an image and a moving image for transmittal by signals to the telecommunication network.

24. The electronic display device of claim 18, wherein at least one of the plurality of sources is associated with a subscriber of the telecommunication network.

25. The electronic display device of claim 18, further comprising means for allowing a user to specify at least one of the plurality of sources.

* * * * *